United States Patent
Ooi et al.

(10) Patent No.: US 10,127,184 B2
(45) Date of Patent: Nov. 13, 2018

(54) LOW OVERHEARD HIGH THROUGHPUT SOLUTION FOR POINT-TO-POINT LINK

(71) Applicant: INTEL CORPORATION, Santa Clara, CA (US)

(72) Inventors: Eng Hun Ooi, Georgetown (MY); Su Wei Lim, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/277,893

(22) Filed: Sep. 27, 2016

(65) Prior Publication Data

US 2018/0089137 A1    Mar. 29, 2018

(51) Int. Cl.
| | |
|---|---|
| *H03M 13/11* | (2006.01) |
| *G06F 13/42* | (2006.01) |
| *G06F 11/10* | (2006.01) |
| *G06F 11/34* | (2006.01) |
| *G06F 11/30* | (2006.01) |

(52) U.S. Cl.
CPC ...... *G06F 13/4282* (2013.01); *G06F 11/1004* (2013.01); *G06F 11/3027* (2013.01); *G06F 11/3037* (2013.01); *G06F 11/3051* (2013.01); *G06F 11/349* (2013.01); *G06F 2213/0026* (2013.01); *H05K 999/99* (2013.01)

(58) Field of Classification Search
CPC .................................................. H03M 13/11
USPC ................................ 714/758, 760, 752, 756
See application file for complete search history.

(56) References Cited

U.S. PATENT DOCUMENTS

| | | | |
|---|---|---|---|
| 7,502,377 B2 | 3/2009 | Lim et al. | |
| 8,281,043 B2 | 10/2012 | Edwards et al. | |
| 8,601,198 B2 | 12/2013 | Teh et al. | |
| 9,152,596 B2 | 10/2015 | Wagh et al. | |
| 9,176,918 B2 | 11/2015 | Hunsaker et al. | |
| 9,367,500 B2 | 6/2016 | Guok et al. | |
| 2012/0151247 A1* | 6/2012 | Ferraiolo | H04L 1/22 714/4.5 |
| 2015/0106679 A1* | 4/2015 | Caggioni | H04L 1/0076 714/776 |
| 2015/0220140 A1 | 8/2015 | Por et al. | |
| 2015/0269109 A1 | 9/2015 | Spry et al. | |
| 2016/0034345 A1 | 2/2016 | Royer, Jr. | |

FOREIGN PATENT DOCUMENTS

| | | |
|---|---|---|
| WO | 2015/011516 A1 | 1/2015 |
| WO | 2016/039791 A1 | 3/2016 |

OTHER PUBLICATIONS

Lawley, Jason "Understanding Performance of PCI Express Systems", White Paper:UltraScale and Virtex-7 FPGAs, WP350 (v1.2) Oct. 28, 2014, 16 pages.

* cited by examiner

*Primary Examiner* — Fritz Alphonse
(74) *Attorney, Agent, or Firm* — Compass IP Law PC

(57) ABSTRACT

An apparatus is described. The apparatus includes a point-to-point link interface circuit. The point-to-point link interface circuit is to support communication with a level of a multi-level system memory. The point-to-point link interface circuit includes a circuit to interlace payload data with cyclic redundancy check (CRC) values, where, different data segments of the payload are each appended with its own respective CRC value.

20 Claims, 9 Drawing Sheets

Fig. 3a

Conventional PCIe 64B TLP Packet

| packet structure | STP | Seq # | TLP hdr | R/W data | LCRC | END |
|---|---|---|---|---|---|---|
| # bytes | 1 | 2 | 12 | 64 | 4 | |

Conventional PCIe 256B TLP Packet

| packet structure | STP | Seq # | TLP hdr | R/W data | LCRC | END |
|---|---|---|---|---|---|---|
| # bytes | 1 | 2 | 12 | 256 | 4 | |

301_2

302

LOW OVERHEARD HIGH THROUGHPUT SOLUTION FOR POINT-TO-POINT LINK

FIELD OF INVENTION

The field of invention pertains generally to the computing sciences, and, more specifically, to a low overhead high throughput solution for point-to-point link.

BACKGROUND

Computing systems typically include a system memory (or main memory) that contains data and program code of the software code that the system's processor(s) are currently executing. A pertinent issue in many computer systems is the system memory. Here, as is understood in the art, a computing system operates by executing program code stored in system memory. The program code when executed reads and writes data from/to system memory. As such, system memory is heavily utilized with many program codes and data reads as well as many data writes over the course of the computing system's operation. Finding ways to improve system memory is therefore a motivation of computing system engineers.

FIGURES

A better understanding of the present invention can be obtained from the following detailed description in conjunction with the following drawings, in which:

FIGS. 3a and 3b show conventional PCIe packet structures;

DETAILED DESCRIPTION 1.0 Multi-Level System Memory

Figure 1:
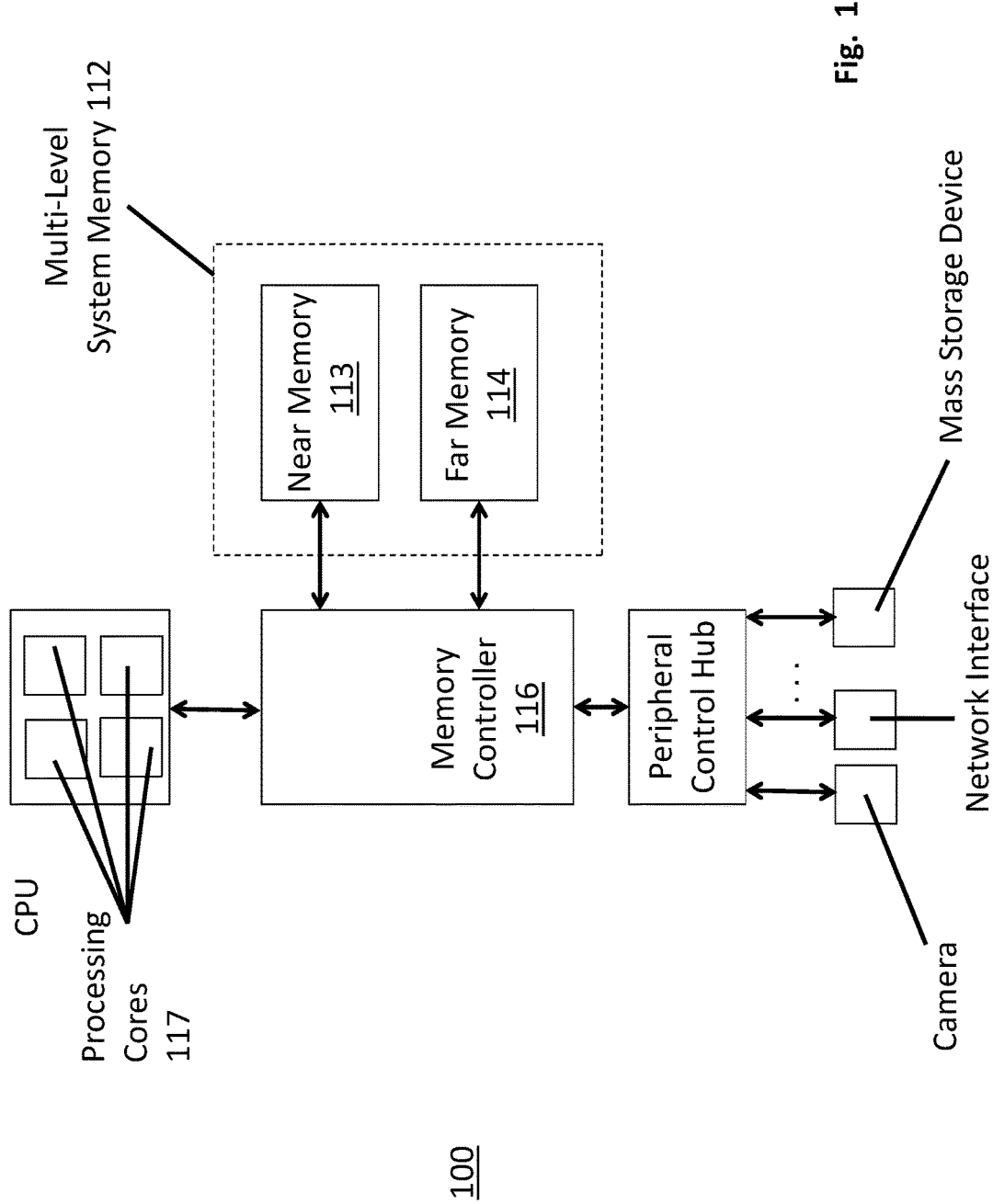
FIG. 1 shows a computing system having a multi-level system memory.

One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger far memory 114.

The use of cache memories for computing systems is well-known. In the case where near memory 113 is used as a cache, near memory 113 is used to store an additional copy of those data items in far memory 114 that are expected to be more frequently called upon by the computing system. The near memory cache 113 has lower access times than the lower tiered far memory 114 region. By storing the more frequently called upon items in near memory 113, the system memory 112 will be observed as faster because the system will often read items that are being stored in faster near memory 113. For an implementation using a write-back technique, the copy of data items in near memory 113 may contain data that has been updated by the central processing unit (CPU), and is thus more up-to-date than the data in far memory 114. The process of writing back 'dirty' cache entries to far memory 114 ensures that such changes are not lost.

According to some embodiments, for example, the near memory 113 exhibits reduced access times by having a faster clock speed than the far memory 114. Here, the near memory 113 may be a faster (e.g., lower access time), volatile system memory technology (e.g., high performance dynamic random access memory (DRAM)) and/or SRAM memory cells co-located with the memory controller 116. By contrast, far memory 114 may be either a volatile memory technology implemented with a slower clock speed (e.g., a DRAM component that receives a slower clock) or, e.g., a non volatile memory technology that may be slower (e.g., longer access time) than volatile/DRAM memory or whatever technology is used for near memory.

For example, far memory 114 may be comprised of an emerging non volatile random access memory technology such as, to name a few possibilities, a phase change based memory, three dimensional crosspoint memory device, or other byte addressable nonvolatile memory devices, "write-in-place" non volatile main memory devices, memory devices that use chalcogenide, single or multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Such emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging byte addressable non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger based accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of. However, far memory 114 may be inefficient when accessed for a small number of consecutive bytes (e.g., less than 128 bytes) of data, the effect of which may be mitigated by the presence of near memory 113 operating as cache which is able to efficiently handle such requests.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting a last level CPU cache. Generally, a CPU cache is optimized for servicing CPU transactions, and will add significant penalties (such as cache snoop overhead and cache eviction flows in the case of hit) to other memory users such as Direct Memory Access (DMA)-capable devices in a Peripheral Control Hub (PCH). By contrast, a memory side cache is designed to handle accesses directed to system memory, irrespective of whether they arrive from the CPU, from the Peripheral Control Hub, or from some other device such as display controller.

In various embodiments, the memory controller 116 and/or near memory 213 may include local cache information (hereafter referred to as "Metadata") 120 so that the memory controller 116 can determine whether a cache hit or cache miss has occurred in near memory 113 for any incoming memory request. The metadata may also be stored in near memory 113.

In the case of an incoming write request, if there is a cache hit, the memory controller 116 writes the data (e.g., a 64-byte CPU cache line) associated with the request directly over the cached version in near memory 113. Likewise, in the case of a cache miss, in an embodiment, the memory controller 116 also writes the data associated with the request into near memory 113, potentially first having fetched from far memory 114 any missing parts of the data required to make up the minimum size of data that can be marked in Metadata as being valid in near memory 113, in a technique known as 'underfill'. However, if the entry in the near memory cache 113 that the content is to be written into has been allocated to a different system memory address and contains newer data than held in far memory 114 (ie. it is dirty), the data occupying the entry must be evicted from near memory 113 and written into far memory 114.

In the case of an incoming read request, if there is a cache hit, the memory controller 116 responds to the request by reading the version of the cache line from near memory 113 and providing it to the requestor. By contrast, if there is a cache miss, the memory controller 116 reads the requested cache line from far memory 114 and not only provides the cache line to the requestor but also writes another copy of the cache line into near memory 113. In many cases, the amount of data requested from far memory 114 and the amount of data written to near memory 113 will be larger than that requested by the incoming read request. Using a larger data size from far memory or to near memory increases the probability of a cache hit for a subsequent transaction to a nearby memory location.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches. Different types of near memory caching architecture are possible (e.g., direct mapped, set associative, etc.).

The physical implementation of near memory and far memory in any particular system may vary from embodiment. For example, DRAM near memory devices may be coupled to a first memory channel whereas emerging non volatile memory devices may be coupled to another memory channel. In yet other embodiments the near memory and far memory devices may communicate to the host side memory controller through a same memory channel. The near memory and/or far memory devices may be integrated in a same semiconductor chip package(s) as the processing cores and memory controller, or, may be integrated outside the semiconductor chip package(s).

In one particular approach, far memory can be (or is) coupled to the host side memory controller through a point-to-point link such as a Peripheral Component Interconnect Express (PCIe) point-to-point link having a set of specifications published by the Peripheral Component Interconnect Special Interest Group (PCI-SIG) (e.g., as found at https://pcisig.com/specifications/pciexpress/). For example, as observed in FIG. 2, the far memory devices 214 may be coupled directly to a far memory controller 220, and, a PCIe link 221 couples the far memory controller 220 to the main host side memory controller 216. The far memory controller 220 performs various tasks that are, e.g., specific to emerging non volatile memory devices 214 that are used for far memory.

For example, the far memory controller 220 may apply signals to the far memory devices 214 having special voltages and/or timing requirements, may manage the movement/rotation of more frequently accessed data to less frequently accessed storage cells (transparently to the system's system memory addressing organization from the perspective of the processing cores under a process known as wear leveling) and/or may identify groups of bad storage cells and prevent their future usage (also known as bad block management).

A PCIe link 221 to the far memory controller 220 may be a computing system's primary mechanism for carrying far memory traffic to/from the host side memory controller 216 and/or, the system may permit for multiple far memory controllers and corresponding far memory devices as memory expansion "plug-ins". In various embodiments, the memory expansion plug-in solutions may be implemented with PCIe links (e.g., one PCIe link per plug-in). Non expanded far memory (provided as part of the basic original system) may or may not be implemented with PCIe links (e.g., DIMM cards having near memory devices, far memory devices or a combination of near and far memory devices may be plugged into a double data rate (DDR) memory channel that emanates from the host side memory controller).

2.0 Low Overhead High Throughput Solution for System Memory Point-to-Point Link

A challenge with implementing a PCIe link as a system memory interconnect is that, generally, PCIe was not originally designed with the kinds of performance demands that system memory requires in mind. Instead, PCIe was designed to handle interconnects to peripheral devices (e.g., disk drives, network interfaces) that do not communicate at the higher bandwidth and low latency levels that are typical of system memory. As such, some innovation that improves the throughput and propagation delay of a PCIe link but that keeps the PCIe link compliant with PCIe standard requirements (e.g., so that standard parts/designs can still be utilized) is desirable.

FIGS. 3a and 3b show prior art PCIe packet structures for two different packet sizes. As is understood in the art, a PCIe link transports packets (referred to as transaction layer packets (TLPs)) from the transmitting end of the link to the receiving end of the link. Packets are data structures having a payload and overhead information. The payload 301_1, 301_2 corresponds to the raw customer data being transported. In the case of system memory, for a link that is pointed from the main memory controller to the far memory controller, the raw customer data corresponds to memory write information. For a link that is pointed from the far memory controller to the main memory controller, the raw customer data corresponds to memory read information.

The overhead is appended by the transmitter to the payload or otherwise inserted into the data stream and ensures that the transmitted data is correctly received and understood at the receiving end. Here, as is understood in the art, PCIe embraces the ability to configure different sized packet structures. FIG. 3a shows a smaller 64 byte payload packet structure and FIG. 3b shows a larger 256 byte payload packet structure. As such, the size of the packet of FIG. 3b is much larger than the size of the packets depicted in FIG. 3a. Specifically, whereas the payload 301_2 of the packet of FIG. 3b is 256 bytes, the payload 301_1 of the packet of FIG. 3a is only 64 bytes.

FIGS. 3a and 3b show exemplary PCIe overhead structures as well. The specific overhead structures of the various versions of PCIe (e.g., Gen 2, Gen 3, etc.) may differ from one another and from the particular structures observed in FIGS. 3a and 3b. As can be seen from FIGS. 3a and 3b, the overhead of a PCIe packet includes a number of fields within the data packet itself. The fields of the TLP packet, include: 1) a start of TLP traffic (STP) field; 2) a sequence number (Seq #) field; 3) a TLP header (TLP_hdr) field; 5) a data link layer cyclic redundancy check (LCRC) field; and, 6) an end of TLP traffic (END) field. Those of ordinary skill understand the purpose of these fields and so they are not explained in detail here.

Of relevance is that for smaller payload packets, such as the packets of FIG. 3a, the overhead represents a significant percentage of the total amount of information being transported over the link. Additionally, other forms of overhead are included in the information stream such as other types of packets besides TLP packets (not shown in FIG. 3a or 3b). For example, PCIe specifies the existence of acknowledgement packets within a link's information stream to, e.g., confirm that a packet sent from the opposing transmitter of an oppositely directed link was successfully received, etc.

Because of the higher percentage of overhead traffic, from both the packet structure itself and the existence of different types of packets within the information stream, the smaller payload packet flows formed from smaller packets such as the packet of FIG. 3a may not exhibit high enough bandwidth for a system memory environment. Essentially, too much capacity of the link is devoted to overhead rather than raw transport of customer data.

A potential option is to increase the size of the packet payload such as increasing the payload to 256 bytes as observed in the packet structure of FIG. 3b. With an increased payload size, a lesser percentage of the total information flow is devoted to overhead which improves the bandwidth of the link from the perspective of raw customer data traffic. Unfortunately the larger packet structure induces a substantial propagation delay because of the cyclic redundancy check (CRC) calculation.

Here, as observed in FIG. 3b, the packet includes an LCRC field 302 that is used at the receiving end to ensure that the data that was received is not corrupted. Here, the entire expanse of the 256 bytes of data that is received at the receiving end is buffered and a CRC calculation is executed on the buffered data. If the calculated CRC from the buffered received data matches the content of the LCRC field 302 that was included in the packet, the payload is deemed not corrupted and an error flag is not raised. Unfortunately the buffering of the received data and the calculation of the CRC on the buffered data effectively increases the propagation delay through the link such that data is passed through the link too slowly for adequate system memory performance.

Thus neither small payloads nor large payloads as is readily configurable with standard PCIe implementations is optimal for implementing a system memory PCIe link. According to one study, the smaller PCIe payload approach has sufficient propagation delay (approximately 16 ns) but insufficient bandwidth (approximately 2.75 GB/s), whereas, the larger PCIe payload approach has sufficient bandwidth (approximately 3.5 GB/s) but insufficient propagation delay (approximately 68 ns).

Figure 4:
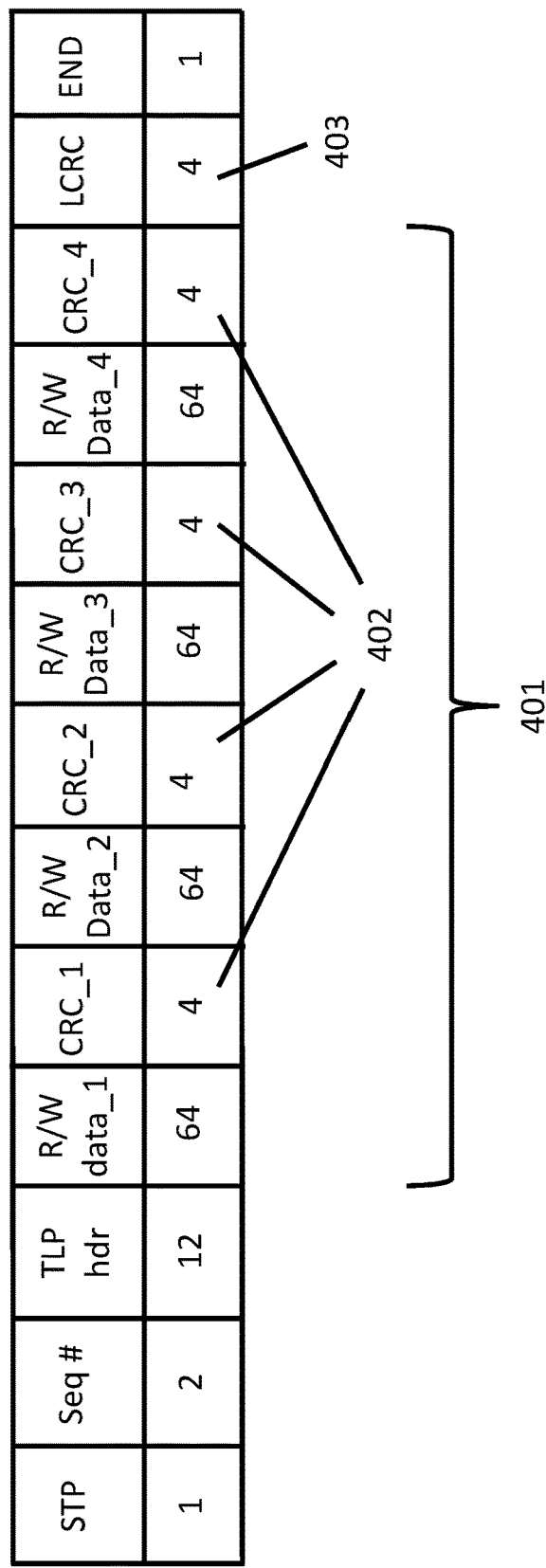
FIG. 4 shows an improved PCIe packet structure.

FIG. 4 shows an improved approach in which the customer payload data 401 is specially inserted with CRC information 402 and placed into a larger payload packet. The insertion of the CRC information 402 into the large payload 401 introduces only a small amount of additional overhead information that only slightly reduces the bandwidth of the link as compared to the approach of FIG. 3b.

Additionally, the inserted CRC information 402 can be used to repeatedly perform "mini" CRC calculations on the customer data as it is received. That is, the CRC_1 field is used to compare with a first CRC calculated only on data segment R/W_Data_1, CRC_2 field is used to compare with a second CRC calculated only on data segment R/W_Data_2, etc. Thus, at the receiving end, as the payload data begins to be received at the receiver, the receiver buffers data segment R/W_Data_1 and calculates a CRC on the information. After CRC field CRC_1 is received it is compared with the CRC result that was just calculated on data segment R/W_Data_1. Assuming the CRCs match and no error flags are raised, the process is repeated for data segment R/W_Data_2 and CRC field CRC_2. If all CRCs calculated from all four of the received data segments (R/W_Data_1 through R/W_Data_4) correspondingly match their CRCs that were embedded into the payload (CRC_1 through CRC_4, respectively), the payload is deemed to be error free.

In various embodiments, the trailing LCRC field 403 is still utilized and checked to keep within the PCIe specification. However in other embodiments, discussed in more detail further below, the LCRC field 403 may not be utilized or is used in place of the CRC_4 field which is not present. In still yet other embodiments, the first CRC calculation (CRC_1) is calculated not only from the customer data R/W_Data_1 but also from the PCIe TLP header. In this case, calculation of the comparison CRC on the receiving end for CRC_1 includes calculation not only from the received R/W_Data_1 but also from the TLP header. For simplicity, the remainder of the present description will refer primarily to the aforementioned approach in which CRC_1 is calculated only from R/W_Data_1.

In this "on-the-fly" repetitive CRC calculation approach, because the CRC calculations themselves are made over a much smaller amount of data, the size of the buffer used to temporarily hold the incoming data R/W data for a CRC calculation is significantly smaller than the buffer used for the approach of FIG. 3b. As such, the propagation delay through the link is dramatically improved as compared to the approach in FIG. 3b. Thus, the improved approach of FIG. 4 has only slightly less bandwidth than the approach of FIG. 3b and much lower propagation delay. In one study the bandwidth of a link having the packet structure of FIG. 4 is approximately 3.4 Gigabytes per second (GB/s) and the propagation delay is approximately 17 nanoseconds (ns) (whereas the approach of FIG. 3b has a bandwidth of approximately 3.5 GB/s and a propagation delay of approximately 68 ns). Thus both the bandwidth and the propagation delay are sufficient for a system memory application.

Figure 5:
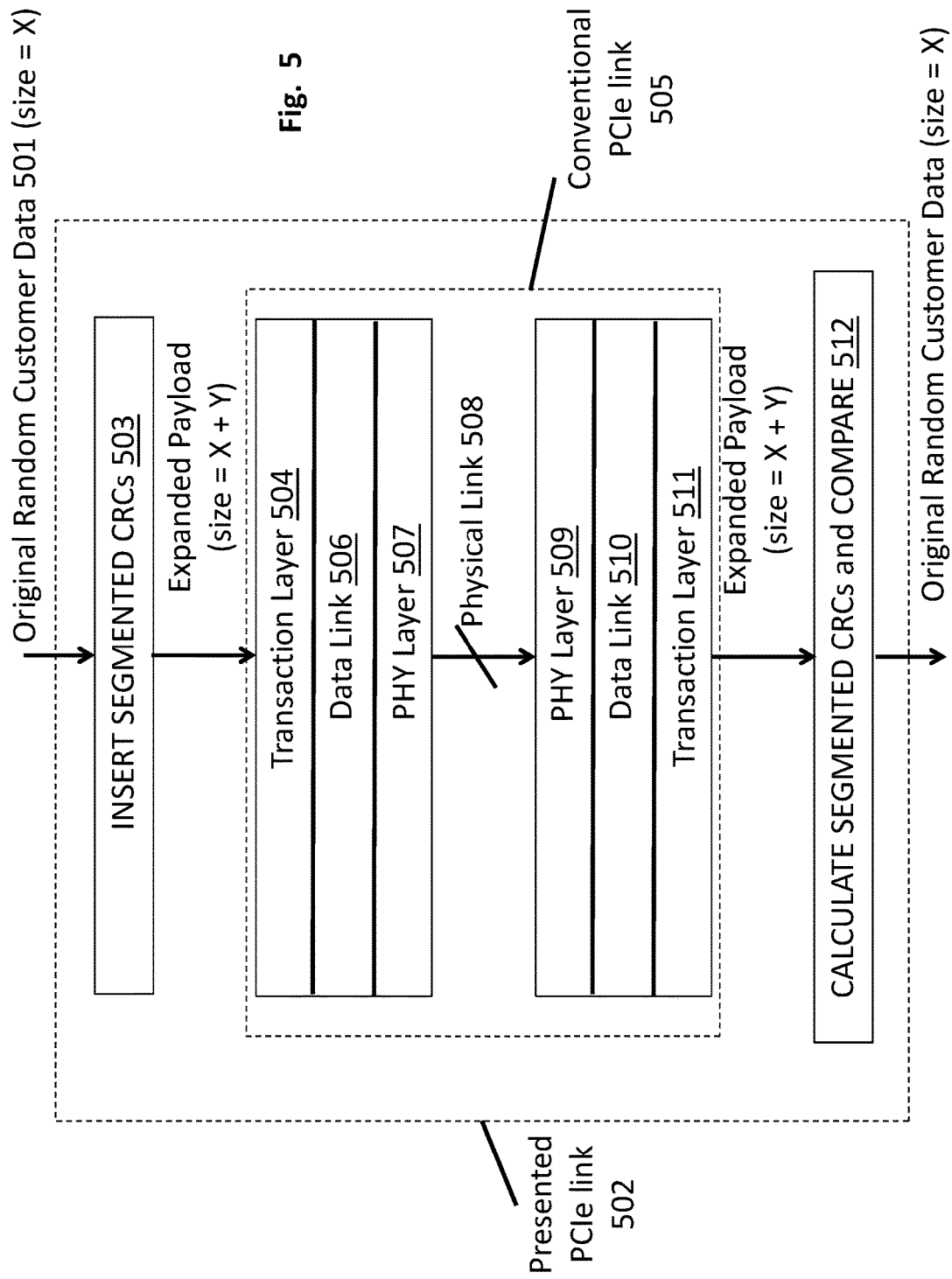
FIG. 5 shows different PCIe layers to implement the improved PCIe packet structure of FIG. 4.

FIG. 5 shows high level circuit designs for both the transmit and receive sides of a PCIe link that is specially designed to impose CRC fields into the TLP packet payload. As observed in FIG. 5, random customer data 501 is presented to the PCIe link logic 502. A first layer 503 in the PCIe link logic 502 calculates CRC values on sequential segments of the random customer data and inserts them into the random customer data such that a CRC field that has been calculated for a particular segment of the customer data is inserted after the particular segment.

The insertion of the CRC fields essentially expands the size of the overall payload. For example, if the original random customer data payload is 256 bytes and each of the CRC fields are four bytes calculated for 64 byte random customer data segments, then the total payload expands to a size of 272 bytes (256 bytes of data+16 bytes of overhead). The expanded payload with repeatedly imposed CRC fields is presented to the transaction layer 504 of any standard PCIe interface 505. Here, the transaction layer 504 may append the payload with the appropriate information depending on the particular PCIe generation that is implemented by the conventional PCIe logic 505.

In the exemplary packet structure of FIG. 4, the PCIe transaction layer 504 appends a TLP header to the expanded payload. The expanded payload and TLP header are presented to a data link layer 506 which appends a sequence number field and an LCRC field. In some embodiments, the calculation and appending of the LCRC field may be avoided as a consequence of the CRC information having been embedded into the payload by the first layer 503. The data link layer formatted structure is then presented to a physical layer 507 which wraps the structure with an STP field and an END field. The resulting data structure is then presented over the physical link 508.

On the receive side, the physical 509, data link 510 and transactional 511 layers perform their specific functions as called out by the applicable PCIe standard which correspond to the reverse of the same roles that were performed on the transmit side. The physical layer 509 removes the STP and END fields, the data link layer 510 removes the sequence number field. Again, in various embodiments, the LCRC field remains valid and is utilized to keep operation within the PCIe specification. In alternate embodiments (e.g. proprietary solutions) the link may be designed to ignore LCRC field on the receive side and/or not include it on the transmit side. In still yet other embodiments the LCRC field may be exist and be utilized but its content is only designed to cover the last data chunk R/W Data_4 and the CRC_4 field is not included or accounted for. The transport layer 511 removes the TLP header.

As such, the last PCIe layer 512 on the receive side receives the original expanded payload that was constructed by the first PCIe layer 503 on the transmit side. The final PCIe layer 512 on the receive side calculates smaller sized CRC values from each data segment in sequence order and compares them to the CRC values that were appended to the data segments as described above. If the CRC values from all segments match their corresponding appended CRC values the payload is deemed to be error free and the original customer data payload without inserted CRC information is presented as the output of the PCIe link.

Figure 2:
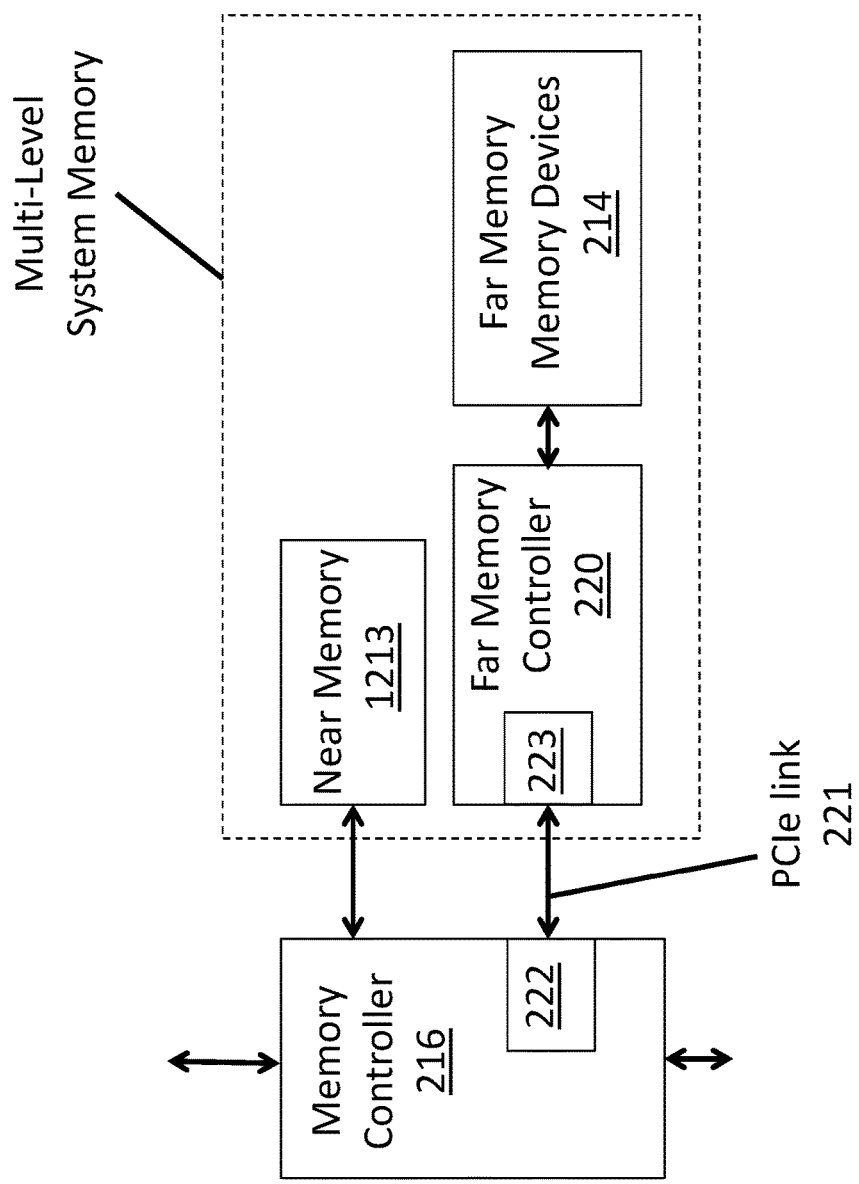
FIG. 2 shows a far memory controller coupled to a main memory controller through a point-to-point link.

Referring briefly back to FIG. 2, note that a first PCIe interface 222 within the main memory controller 216 and a second PCIe interface 223 within the far memory controller 220 may be configured to operate as described above with respect to FIG. 5. Here, a first link carries write data from the main memory controller 216 to the far memory controller 220 and a second link carries read data from the far memory controller 220 to the main memory controller.

Figure 6A:
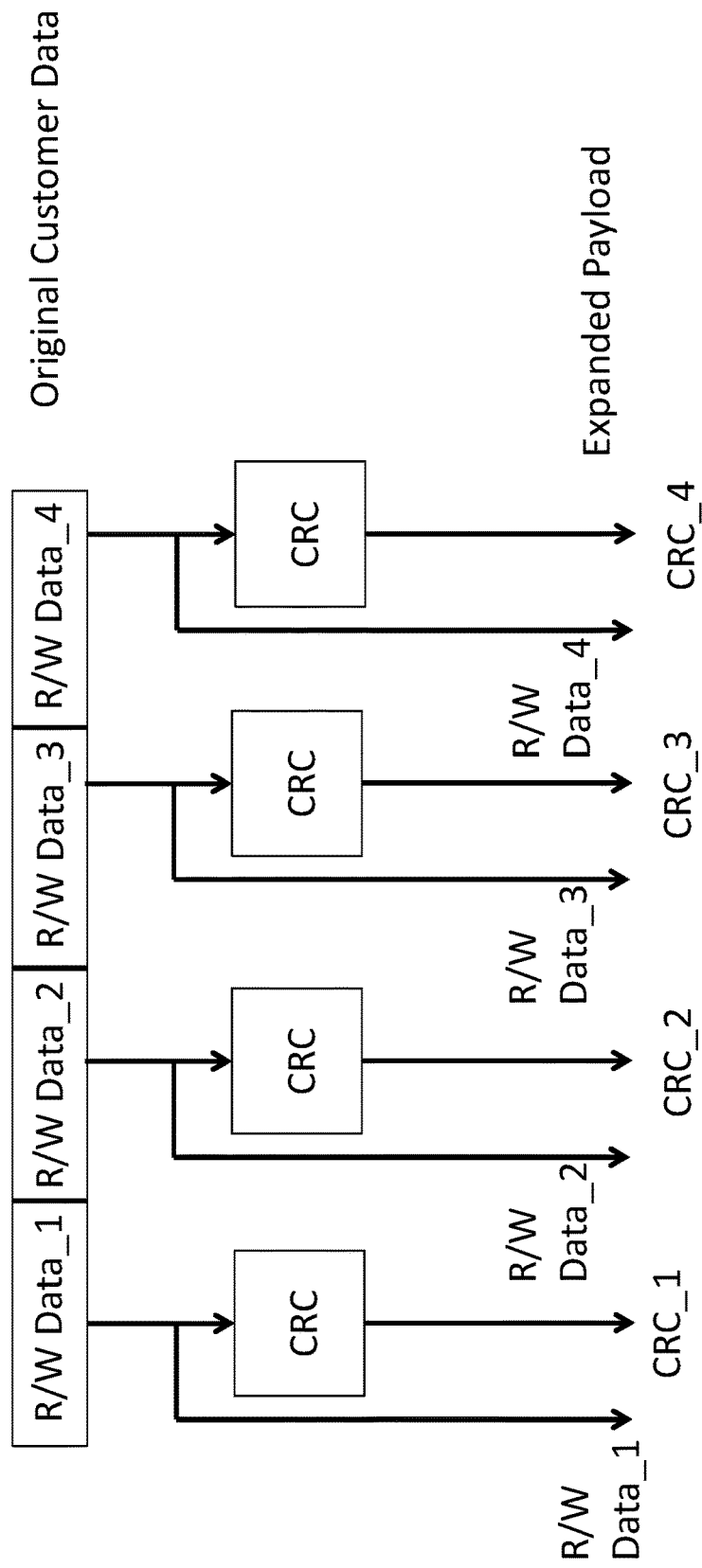
FIGS. 6a and 6b show transmit and receive PCIe layers for interlacing random customer data payload with CRC information.
Figure 6B:
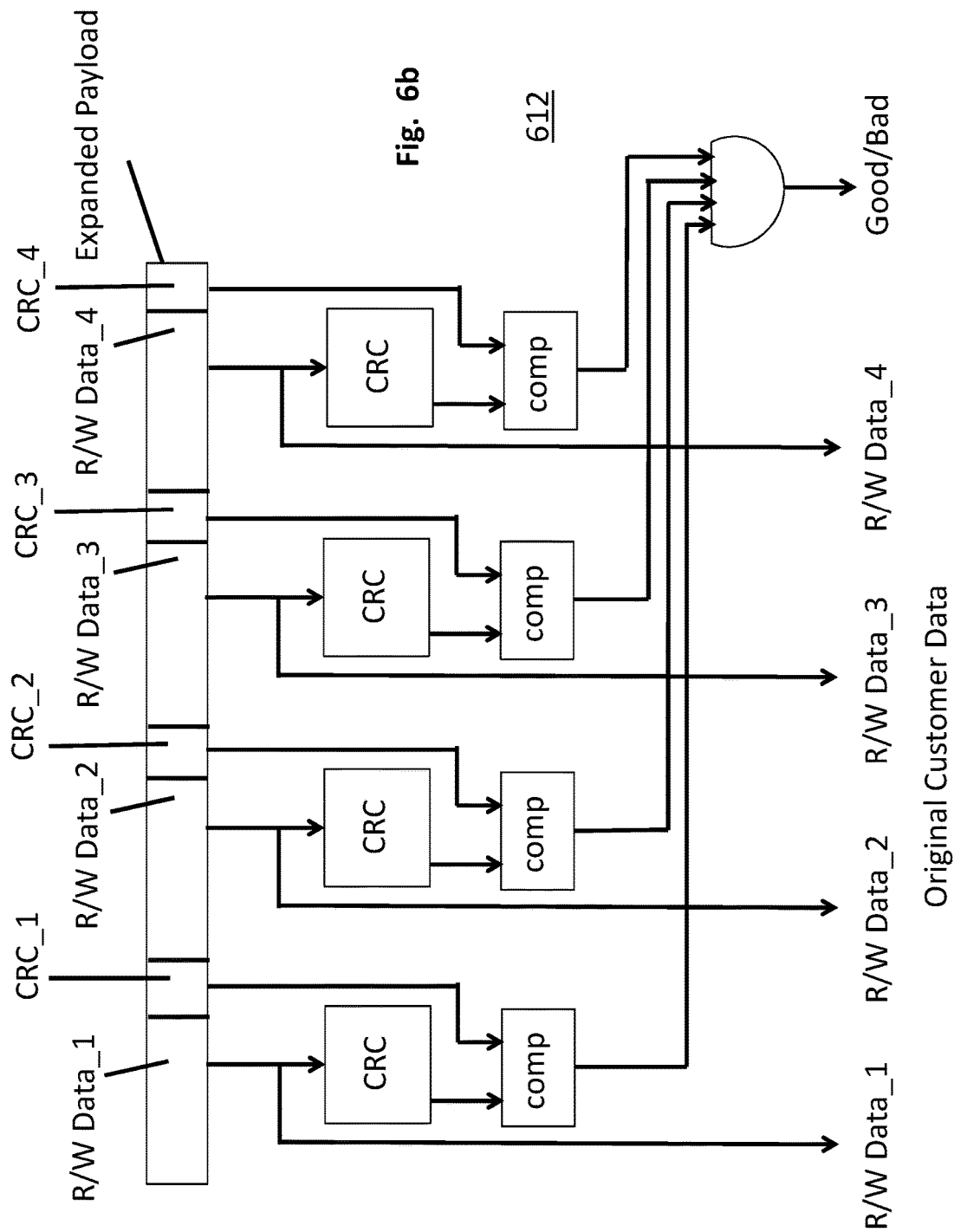

FIG. 6a shows an embodiment 603 of the first PCIe layer on the transmit side as discussed just above and FIG. 6b shows an embodiment of the last PCIe layer on the receive side as discussed just above.

As observed in FIG. 6a, the transmit side has a multi-path arrangement of CRC circuits and data steering channels. The CRC circuits calculate CRC values for respective segments of incoming random customer data (also referred to as words). The data steering channels effectively insert the calculated CRC values into the payload at their appropriate locations. Each expanded data word is then presented to the lower transport layer (ultimate parallel to serial conversion is performed, e.g., at the physical layer).

FIG. 6b shows the last layer 612 of the receive side which includes a parallel structure of CRC calculation circuits and comparison circuits. Each CRC circuit includes a data buffer circuit and other logic circuitry to calculate a CRC value from a corresponding segment of received random customer data. The comparison circuit compares the received CRC value for a data segment with the calculated CRC value for a data segment. If all comparison circuits yield a match, the received payload is deemed good and the random customer data (but not the embedded CRC information) is forwarded as the output payload of the PCIe link. Notably, the buffer circuits within the CRC circuits are smaller in that they only need to be sufficient for a smaller data segment rather than the entirety of the random customer data. As discussed above, the smaller buffer circuit reduces the propagation delay through the link.

It is important to note that actual payload sizes, bandwidths and propagations delays may vary from embodiment. However, at least some embodiments envision random customer data payloads at least as large as 256 bytes per packet. It is also important to note that although the above discussion has been largely directed to a PCIe link, it is conceivable that other types of links may incorporate the teachings provided herein.

Although the embodiments described above were directed to a point-to-point link within a system memory, it is pertinent to recognize that the techniques described above can be applied to any point-to-point link (e.g., a point-to-point link within a data or telecommunications network, a point-to-point link between a peripheral device (e.g., network adaptor, mass storage) and a host side peripheral controller (also referred to as an I/O controller or I/O control function), etc.

Figure 7:
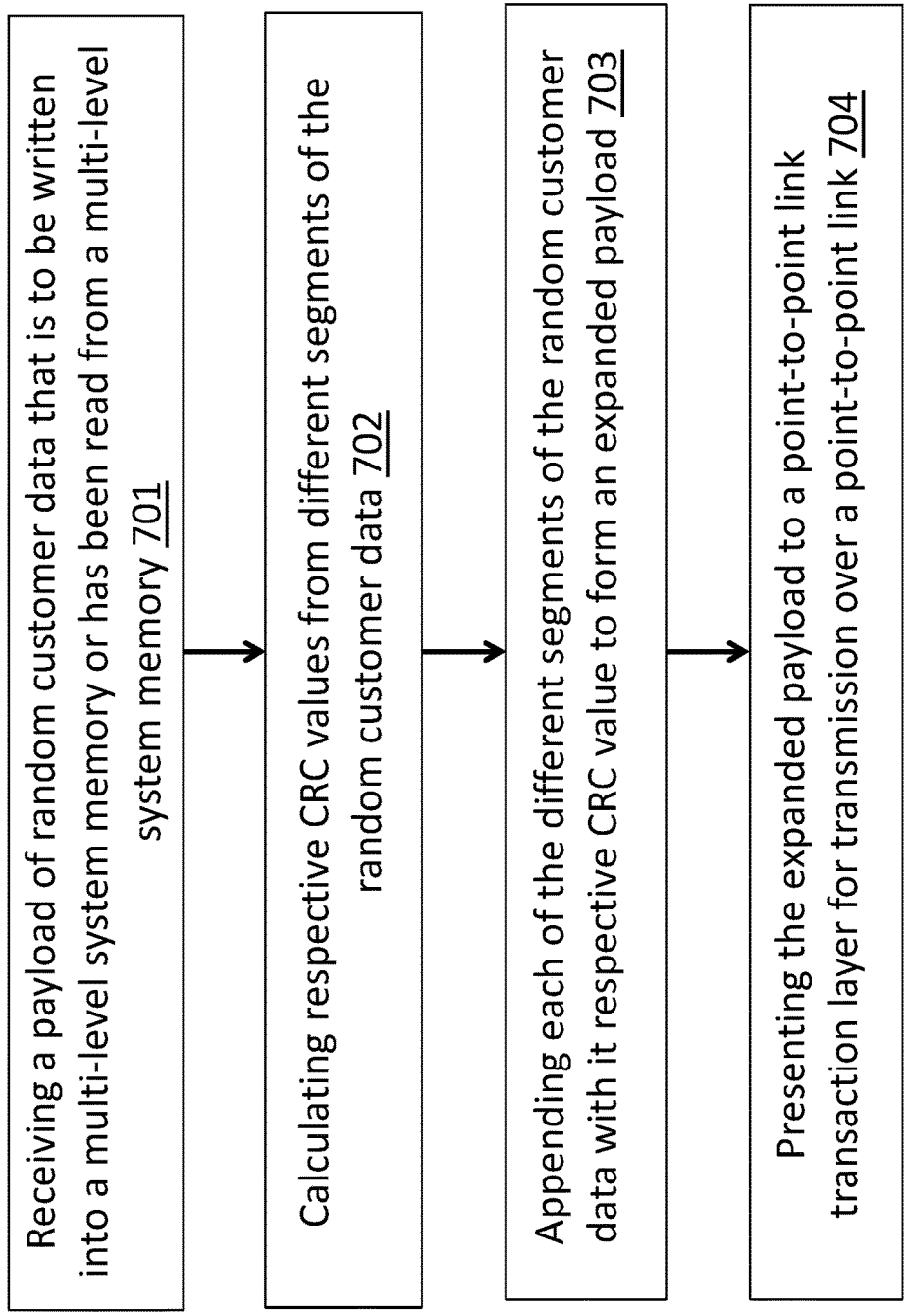
FIG. 7 shows a methodology to implement the improved packet structure of FIG. 4.

FIG. 7 shows a methodology described above. The method includes receiving a payload of random customer data that is to be written into a multi-level system memory or has been read from a multi-level system memory 701. The method includes calculating respective CRC values from different segments of the random customer data 702. The method includes appending each of the different segments of the random customer data with its respective CRC value to form an expanded payload 703. The method includes presenting the expanded payload to a point-to-point link transaction layer for transmission over a point-to-point link 704.

3.0 Computing System Embodiments

Figure 8:
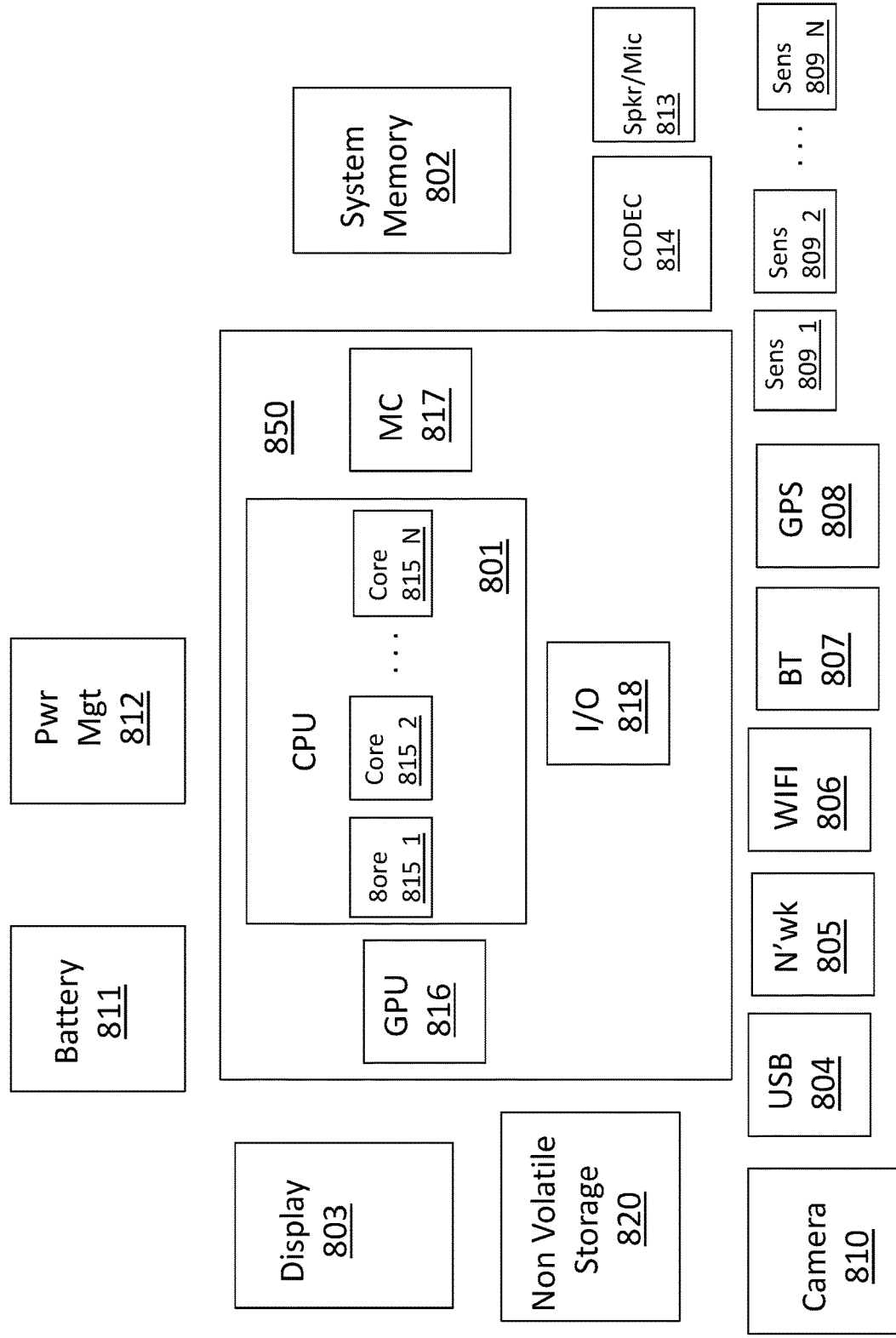
FIG. 8 shows a computing system.

FIG. 8 shows a depiction of an exemplary computing system 800 such as a personal computing system (e.g., desktop or laptop) or a mobile or handheld computing system such as a tablet device or smartphone, or, a larger computing system such as a server computing system. As observed in FIG. 8, the basic computing system may include a central processing unit 801 (which may include, e.g., a plurality of general purpose processing cores and a main memory controller disposed on an applications processor or multi-core processor), system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_N (e.g., one or more of a gyroscope, an accelerometer, a magnetometer, a temperature sensor, a pressure sensor, a humidity sensor, etc.), a camera 810, a battery 811, a power management control unit 812, a speaker and microphone 813 and an audio coder/decoder 814.

An applications processor or multi-core processor 850 may include one or more general purpose processing cores 815 within its CPU 801, one or more graphical processing units 816, a memory management function 817 (e.g., a memory controller) and an I/O control function 818. The general purpose processing cores 815 typically execute the operating system and application software of the computing system. The graphics processing units 816 typically execute graphics intensive functions to, e.g., generate graphics information that is presented on the display 803. The memory control function 817 interfaces with the system memory 802. The system memory 802 may be a multi-level system memory such as the multi-level system memory discussed at length above.

A point-to-point link as described above, such as a PCIe link, enhanced to interlace large payloads of random customer read/write data with CRC values to reduce propagation delay while maintain high bandwidth may be used as a communication technology for the system memory. For example, such a link may couple a main memory controller 817 to a far memory controller (not shown) that is directly coupled to far memory devices of the system. The PCIe link may also be located in other system locations such as between the I/O control function 817.

Each of the touchscreen display 803, the communication interfaces 804-807, the GPS interface 808, the sensors 809, the camera 810, and the speaker/microphone codec 813, 814 all can be viewed as various forms of I/O (input and/or output) relative to the overall computing system including, where appropriate, an integrated peripheral device as well (e.g., the camera 810). Depending on implementation, various ones of these I/O components may be integrated on the applications processor/multi-core processor 850 or may be located off the die or outside the package of the applications processor/multi-core processor 850.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a point-to-point link interface circuit, the point-to-point link interface circuit to support communication with a level of a multi-level system memory, the point-to-point link interface circuit comprising a circuit to, in order to reduce propagation delay of a packet, interlace payload data of the packet with cyclic redundancy check (CRC) values of the packet, where, different data segments of the payload are each appended with its own respective CRC value.

2. The apparatus of claim 1 wherein the point-to-point link interface circuit comprises a Peripheral Component Interconnect Express (PCIe) compliant interface.

3. The apparatus of claim 1 wherein an LCRC field of a PCIe packet structure is not utilized.

4. The apparatus of claim 1 wherein the point-to-point link interface circuit is disposed on a main memory controller that is to interface to the multi-level system memory.

5. The apparatus of claim 1 wherein the point-to-point link interface circuit is disposed on a controller that is to reside between a main memory controller that is to interface with the multi-level system memory and emerging non volatile system memory technology devices.

6. The apparatus of claim 5 wherein the emerging non volatile system memory technology stores data with resistive storage cells.

7. The apparatus of claim 1 wherein the circuit precedes a PCIe transaction layer circuit in the transmit direction.

8. The apparatus of claim 1 wherein the circuit follows a PCIe transaction layer circuit in the receive direction.

9. A computing system, comprising:
a plurality of processing cores;
a multi-level system memory;
main memory controller coupled to the multi-level system memory
a point-to-point link interface circuit, the point-to-point link interface circuit to support communication with a level of a multi-level system memory, the point-to-point link interface circuit comprising a circuit to, in order to reduce propagation delay of a packet, interlace payload data of the packet with cyclic redundancy check (CRC) values of the packet, where, different data segments of the payload are each appended with its own respective CRC value.

10. The computing system of claim 9 wherein the point-to-point link interface circuit comprises a PCIe compliant interface.

11. The computing system of claim 9 wherein an LCRC field of a PCIe packet structure is not utilized.

12. The computing system of claim 9 wherein the point-to-point link interface circuit is disposed on a main memory controller that is to interface to the multi-level system memory.

13. The computing system of claim 9 wherein the point-to-point link interface circuit is disposed on a controller that is to reside between a main memory controller that is to interface with the multi-level system memory and emerging non volatile system memory technology devices.

14. The computing system of claim 13 wherein the emerging non volatile system memory technology devices comprise chalcogenide.

15. The computing system of claim 9 wherein the circuit precedes a PCIe transaction layer circuit in the transmit direction.

16. The computing system of claim 9 wherein the circuit follows a PCIe transaction layer circuit in the receive direction.

17. A method performed by a point-to-point interface circuit to reduce propagation delay of a packet, comprising:

receiving a payload of random customer data that is to be written into a multi-level system memory or has been read from a multi-level system memory;
calculating respective CRC values from different segments of the random customer data;
appending each of the different data segments of the payload with its respective CRC value to form an expanded payload;
presenting the expanded payload to a point-to-point link transaction layer for transmission of the packet over a point-to-point link.

18. The method of claim 17 wherein the point-to-point link is a PCIe compliant link.

19. The method of claim 17 wherein the method is performed on a main memory controller that interfaces with the multi-level system memory.

20. The method of claim 17 wherein the method is performed on a controller that resides between a main memory controller that interfaces with the multi-level system memory and emerging non volatile memory devices of the multi-level system memory.

* * * * *